July 15, 1952 G. W. SCHATZMAN 2,603,511
FENDER SHIELD ATTACHING MEANS
Filed Nov. 8, 1946 4 Sheets-Sheet 1
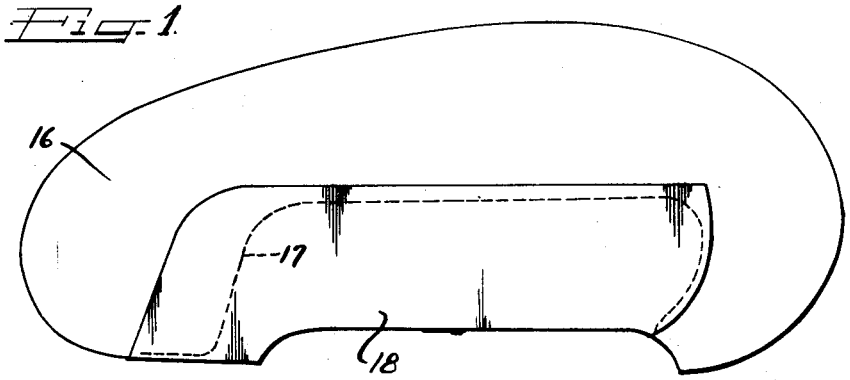
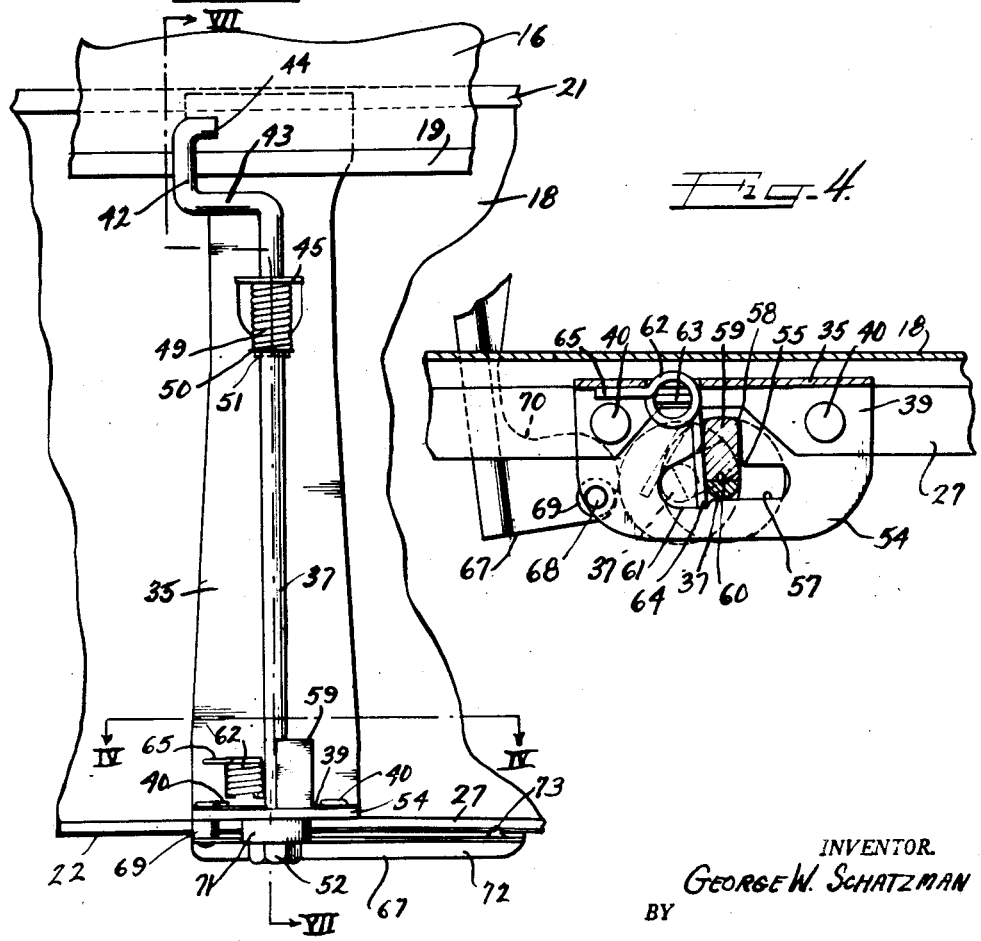
INVENTOR.
GEORGE W. SCHATZMAN
BY
The Firm of Charles W. Hills
ATTYS.

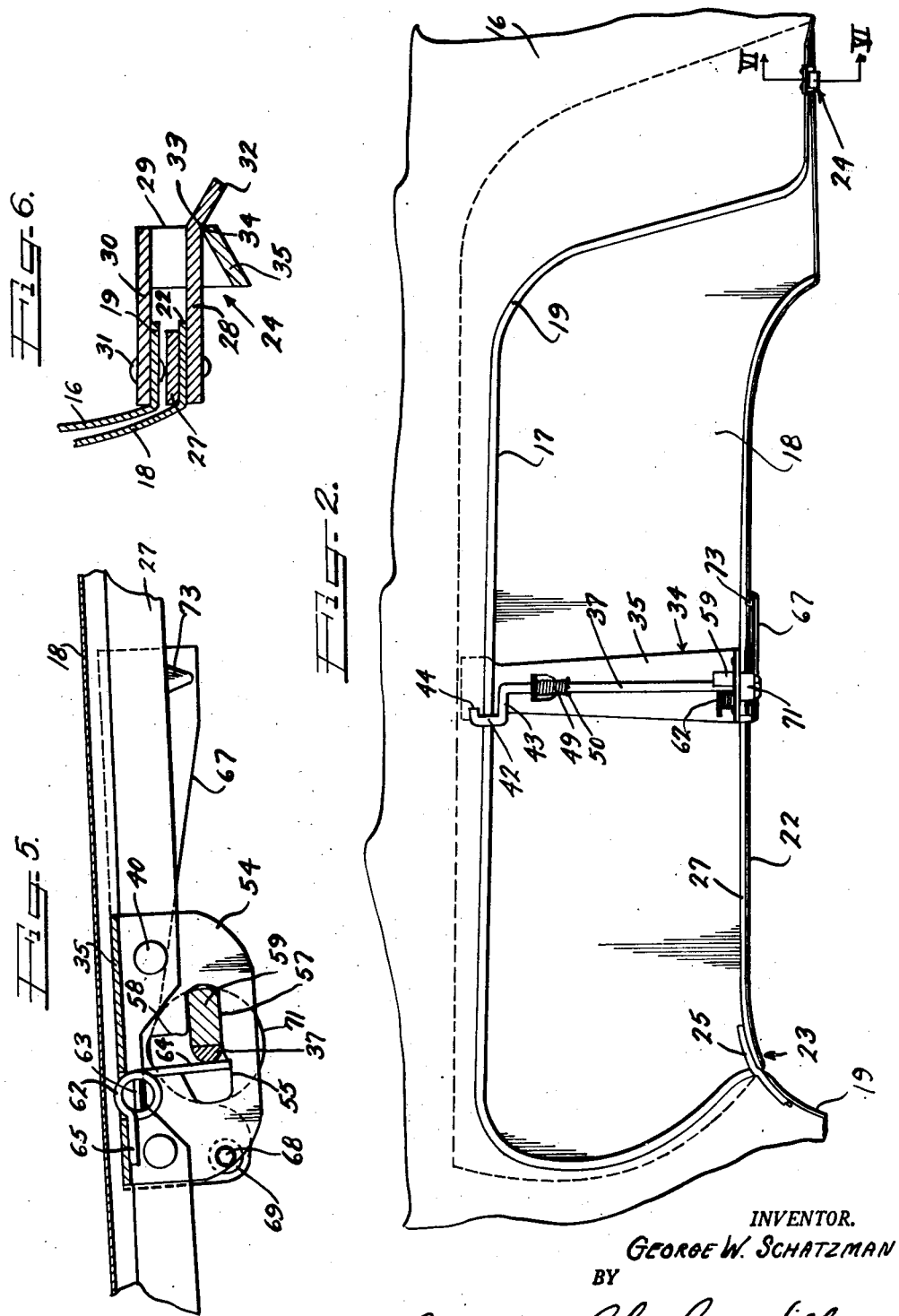

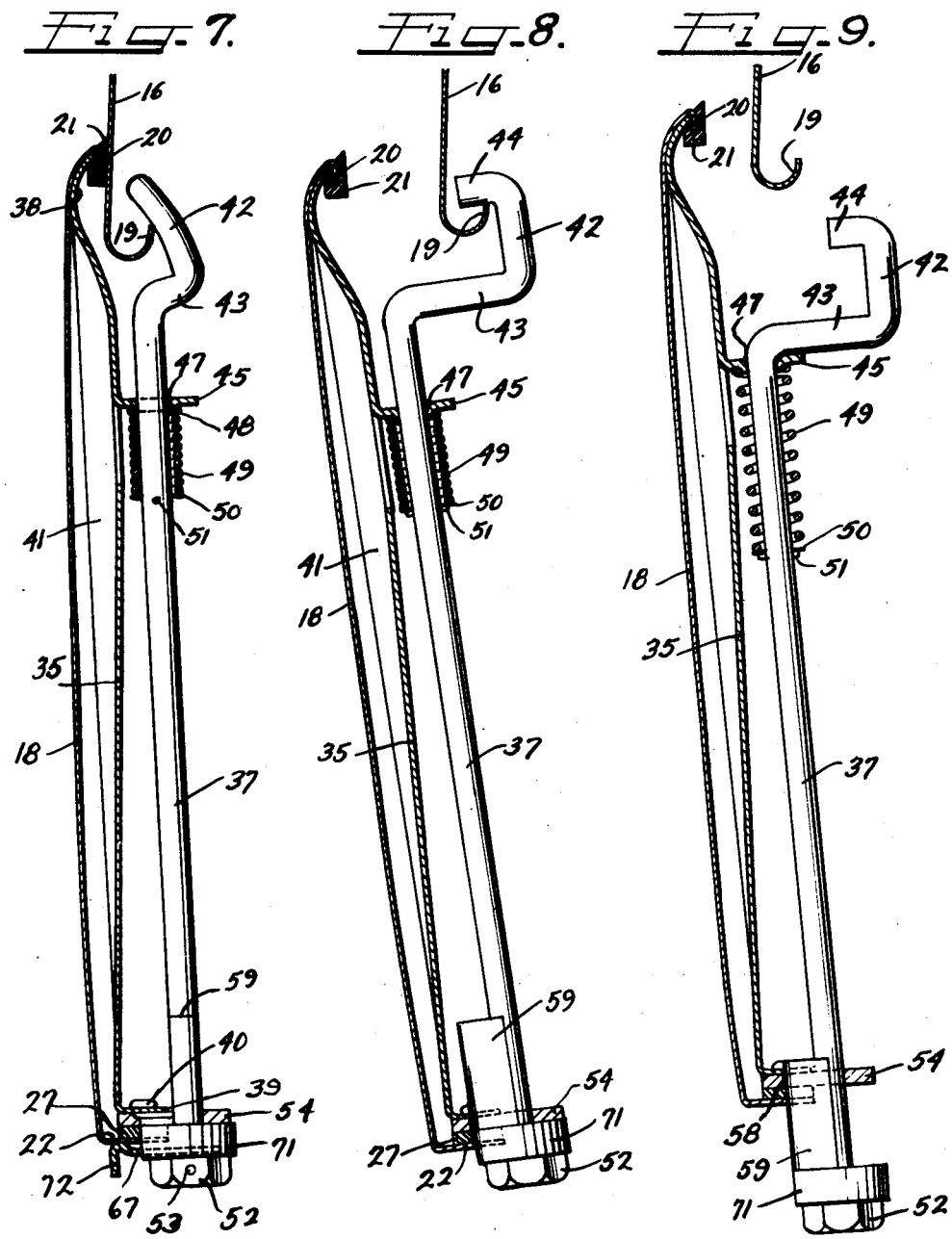

July 15, 1952 G. W. SCHATZMAN 2,603,511
FENDER SHIELD ATTACHING MEANS
Filed Nov. 8, 1946 4 Sheets-Sheet 4
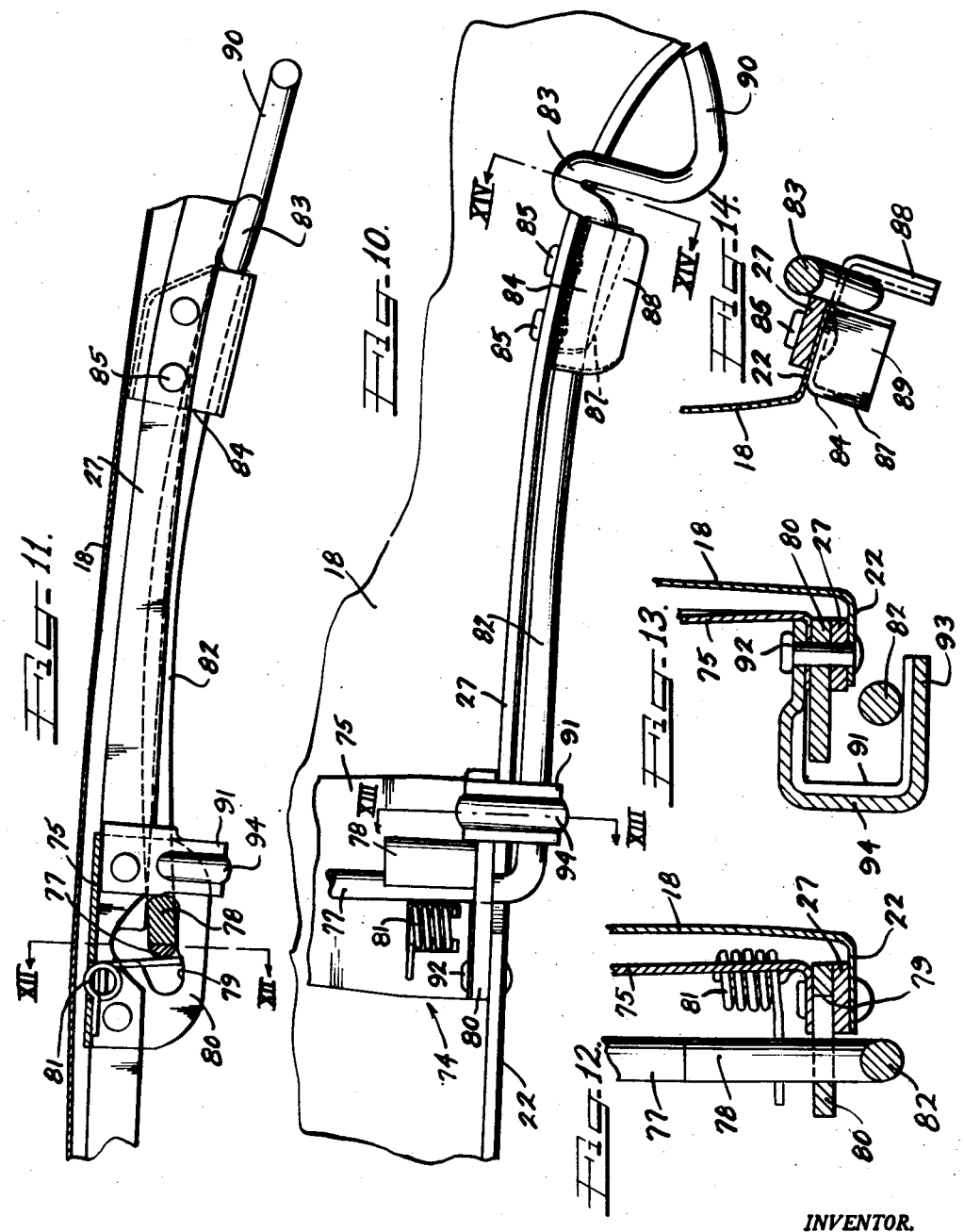
INVENTOR.
GEORGE W. SCHATZMAN
BY
The Firm of Charles W. Hills
ATTYS.

Patented July 15, 1952

2,603,511

UNITED STATES PATENT OFFICE 2,603,511

FENDER SHIELD ATTACHING MEANS

George W. Schatzman, Detroit, Mich., assignor to Houdaille-Hershey Corporation, Detroit, Mich., a corporation of Michigan Application November 8, 1946, Serial No. 708,511

11 Claims. (Cl. 292—114)

This invention relates to fender and fender skirt or shield structures, and more particularly to novel fender and fender shield assemblies including improved attaching means for clamping and latching the fender shield in place on the fender.

In the vehicle inducstry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since such an opening inherently presents an unattractive outward appearance, detachable fender shields have been employed to substantially cover the opening and improve the appearance of the fender.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender is separated from the vehicle body part, partly separated from the vehicle body part, or actually an integral part of the vehicle body, and whether or not it projects outwardly away from the principal body portion of the vehicle.

An important object of the present invention is to provide a novel fender and fender shield assembly in which the fender shield is secured to the fender in a novel manner.

Another object of the invention is to provide a novel fender shield construction having improved means for readily and quickly attaching and detaching the fender shield with respect to the vehicle fender.

Another object of this invention is to provide a fender shield having novel clamping and latching means thereon.

Still another object of the invention is to provide a novel mechanism for detachably securing a fender shield in closing relation to the access opening of the vehicle fender.

A further object of the invention is to provide a novel mechanism for securing a fender shield detachably to a fender and having certain semi-automatic features rendering it unusually simple and easy to operate while at the same time improving its function and serviceability.

Other objects, features and advantages of the present invention will become readily apparent from the following detailed description of certain preferred embodiments thereof taken in conjunction with the accompanying four sheets of drawings in which:

Figure 1 is a side elevational view of a fender and fender shield assembly according to the present invention;

Figure 2 is a fragmentary, somewhat enlarged inside elevational view of the fender shield and the immediately adjacent portion of the fender about the wheel opening;

Figure 3 is a further enlarged fragmentary inside elevational view of that portion of the fender shield and the contiguous portion of the fender with which novel latching and clamping mechanism cooperate;

Figure 4 is a further enlarged horizontal sectional detail view taken substantially along the line IV—IV of Figure 3 and showing the various operating parts of the clamping and latching mechanism when unlatched;

Figure 5 is a view similar to Figure 4 but showing the mechanism in its latching and clamping condition;

Figure 6 is a vertical, sectional detail view on an enlarged scale taken substantially along the line VI—VI of Figure 2;

Figure 7 is an enlarged, vertical, sectional view taken substantially along the line VII—VII of Figure 3 and showing the latching and clamping mechanism in the fully closed, latching and clamping service condition thereof;

Figure 8 is a vertical, sectional view similar to Figure 7 but showing the latching and clamping mechanism open and in intermediate fender shield attaching position;

Figure 9 is a vertical, sectional view similar to Figures 7 and 8 but showing the latching and clamping mechanism in the fully released position thereof;

Figure 10 is a fragmentary, inside, elevational view of a fender shield showing a modified form of a latching and clamping mechanism as found in a right hand fender shield;

Figure 11 is a sectional, top plan view of that portion of the fender shield and latching and clamping mechanism assembly shown in Figure 10;

Figure 12 is a vertical, sectional detail view taken substantially along the line XII—XII of Figure 11;

Figure 13 is a vertical, sectional detail view taken substantially along the line XIII—XIII of Figure 10; and Figure 14 is a vertical, sectional, detail view of a locking bracket and latching rod handle assembly identical with Figure 10 but reversed as found in a left hand fender shield and taken on a plane which, merely for orientation, is indicated by the line XIV—XIV of Figure 10.

In the exemplary form of the invention shown in Figures 1 to 9, inclusive, of the drawings, a vehicle fender 16 is shown as having a wheel opening 17 over which a fender shield 18 is mounted in attractive closing relation. The fender shield is formed as a sheet metal panel marginally overlapping the fender about the wheel opening.

The lower edge of the fender is reinforced and finished by an inwardly extending flange 19 which at the wheel opening is curled upwardly in the form of an open bead of substantially hook shape cross-section with its edge spaced inwardly from the inner face of the fender (Figs. 2 and 7).

Where the fender shield 18 engages the fender 16, the margin of the fender shield is inwardly curvate and terminates in an integral downwardly extending flange 20 which is encompassed by a resilient gasket 21 made from rubber or the like. At its lower edge, the fender shield 18 is formed with an inwardly extending horizontal reinforcing flange 22.

Primary attachment of the fender shield 18 to the fender 16 is effected through the medium of a hanger bracket structure 23 at the front end of the fender shield and a hanger bracket structure 24 at the rear of the fender shield, as seen in Fig. 2. By preference the hanger structures 23 and 24 are so related that in mounting the fender shield it can be initially assembled at its lower edge with the fender 16 and can then be swung about a substantially horizontal axis about said lower edge into engagement with the fender 16. To this end the hanger bracket structure 23 comprises an elongated arm 25 extending forwardly beyond the lower end of the fender shield and carried by a reinforcing bar 27 supported upon and carried by the lower fender shield reinforcing flange 22. The projecting portion of the hanger arm 25 is engageable with the adjacent portion of the fender shield reinforcing flange 19.

The rear hanger bracket 24 (Figs. 2 and 6) comprises a hanger finger 28 secured to the fender shield reinforcing flange 22 and engageable within a hanger eye 29 depending from an inwardly extending hanger bracket bar 30 which is secured as by means of rivets 31 to the fender shield reinforcing flange 19. The outer end of the hanger finger 28 is formed as a downwardly and inwardly oblique angular hook terminal or flange 32 which at its juncture with the body of the finger 28 provides a reentrant groove 33 engageable upon an interlock edge 34 of a horizontal hanger bar forming the lower portion of the hanger eye 29.

The relationship of the hanger finger 28 and the hanger eye 29 is such that after the hook flange 32 has been inserted through the eye while the fender shield 18 is tilted outwardly from the fender 16, and the fender shield has then been rocked into service position in engagement with the fender 16, the flange 32 cannot be displaced outwardly from the eye 29 due to the interlocking engagement in the groove 33 of the hanger bar edge 34. In this manner, the preliminary mounting of the fender shield 18 is adapted to be effected simply and quickly merely by moving the hanger arm 25 into engagement with the fender flange 19 and extending the hanger finger 28 through the hanger eye 29 while the fender shield 18 is tilted outwardly relative to the fender 16, and then swinging the fender shield up into service position into engagement with the fender.

According to the present invention, improved means are provided for clamping and latching the fender shield 18 in the service position in enclosing relation to the fender opening 17 and in snug engagement with the fender 16. Such means comprise latching and clamping mechanism 34 of which the principal component comprises a supporting bar or plate 35 mounted in fender-shield reinforcing relation at the rear center of the fender shield, and a latching and clamping member 37, the latter being mounted upon and guided by the bar 35 to be manipulated into and out of latching and clamping engagement with the fender flange 19.

In preferred form, the supporting bar 35 comprises an elongated sheet metal plate having the upper portion thereof bowed slightly inwardly and formed at its upper end with a return bent curvate flange 38 adapted to engage complementally within the upper curvate margin of the fender shield 18 behind the reinforcing flange 20 thereof. A foot flange 39 on the bar 35 extends right angularly inwardly and is secured as by means of rivets 40 to the lower marginal reinforcing bar 27 of the fender shield. Outwardly turned reinforcing flanges 41 may be formed on the respective opposite edges of the supporting bar 35.

In a convenient, economical and efficient form, the latching and clamping member 37 comprises a cylindrical rod which is formed at its upper end with a curvate latching and clamping head 42 which is connected to the main body of the rod 37 by means of an integral right angular spacer or offsetting portion or arm 43.

In further accordance with the invention, the clamping and latching rod 37 is supported in such a manner that it can be moved reciprocably and rotatably into and out of clamping relation to the fender flange 19. Thus, in mounting or dismounting the fender shield 18 the clamping and latching member 37 is adapted to be moved into a position clear of the fender flange 19 to facilitate swinging the fender shield into or out of the fender-engaging service position thereof (Fig. 9). After the fender shield has been swung into the service position in engagement with the fender, the latching and clamping member 37 is adapted to be moved into clamping and latching engagement with the fender reinforcement flange 19 (Fig. 7) by a simple manual action. Furthermore, the latching and clamping member 37 is so constructed that as a preliminary to the latching and clamping manipulation thereof, or as a preliminary to removal or dismounting of the fender shield, a right angular hook extension or terminal 44 on the upper end of the head 42 is adapted to effect engagement with the fender flange 19 (Fig. 8).

To the accomplishment of these ends, the latching and clamping rod 37 is reciprocably and rotatably guided by an inwardly extending horizontal guide ear 45 which may be integrally struck out from the inwardly bowed portion of the body of the supporting bar 35 adjacent the upper end thereof.

The guide ear 45 is formed with an aperture or bearing eye 47 and reinforced by a flange 48 which affords a relatively free and smooth guide bearing for reciprocal and rotary movement of the clamping and latching rod 37. The ear 45 also serves as a stop to limit downward movement of the rod 37 in the non-latching condition thereof, by engaging the arm 43, as shown in Fig. 9.

By preference means is provided for normally biasing the latching and clamping rod 37 toward non-latching position, such means herein comprising a coiled compression spring 49 concentrically surrounding the rod 37 and bearing at its upper end against the lower side of the bearing ear 45 as a fixed abutment, while its lower end bears resiliently against a retaining washer 50 secured in place on the rod 37 by means such as a transverse pin 51. The weight, tension, and disposition of the biasing spring 49 is such that it normally acts to expand and push the latching and clamping rod 37 downwardly into the non-latching position, as shown in Fig. 9, or the intermediate hook-on position shown in Fig. 8. The spring 49 is substantially compressed or loaded when the rod 37 is moved in opposition to the spring bias into the latching and clamping position substantially as shown in Fig. 7.

At its lower end, the latching and clamping rod 37 is provided with means for convenient manipulation thereof, herein comprising a nut 52 secured non-rotatably thereon as by means of a pin 53 and adapted to be engaged by and manipulated through the medium of a suitable socket wrench or the like (not shown). In other words, a wrench applied to this manipulating member or nut 52 is capable of moving the latching and clamping rod 37 in opposition to the bias of the spring 49 and also for rotating the rod.

Adjacent to its lower end, the latching and clamping rod 37 is guided by means such as a guide plate 54 which also preferably functions as an interlock for holding the rod 37 nonrotatable in the latching and clamping and in the nonlatching positions of the rod. To this end, the plate 54 is secured to the fender shield 18 as by interposing the outer margin thereof between the top of the lower fender shield flange reinforcing bar 27 and the lower face of the hook flange 39 of the bar 35, whereby the rivets 40 effectively secure the plate in place. The guide bar 54 extends inwardly beyond the fender shield flange 22 and the reinforcing bar 27 and the foot flange 39 assembled therewith to a distance at least substantially matching the extent of the bearing ear 45 and has a guiding aperture 55 therein through which the lower end portion of the rod 37 above the nut 52 extends (Figs. 4 and 7).

For the purpose of effecting an interlock with the latching and clamping rod 37 and yet permit the rod to be manipulated freely, the guide aperture 55 is preferably formed with a pair of substantially right angular divergent interlock notches 57 and 58 adapted to accommodate an interlock lug 59. In the present instance, the lug 59 secured as by welding to a flatted area 60 on the portion of the rod 37 which extends through the aperture 55. The notch 57 is so disposed that it will receive the interlock lug 59 when the latching and clamping rod 37 is in the latching and clamping position, while the interlock notch 58 is disposed to receive the interlock lug 59 in the non-latching position of the latching and clamping rod substantially as shown in Figs. 4 and 5, respectively. A turn enlargement 61 opening from the convergence of the notches 57 and 58 permits the rod 37 and the interlock lug 59 to be cleared from the interlock notches and turned, substantially as indicated in broken outline in Fig. 4.

Means are preferably provided for normally urging and holding the latching and clamping rod 37 and the interlock lug 59 in either of the interlocked positions thereof in the opening 55. Such means herein comprises a resilient member such as a coiled torsion spring 62 engaged upon a mounting lug or finger 63 struck out from the lower end portion of the supporting bar 35 and offset inwardly therefrom adjacent to the lower end portion of the latching and clamping bar 37. Thereby a biasing arm 64 on the spring is adapted to bear against the latching and clamping rod 37 in the vicinity of the flatted area 60 while a tensioning arm 65 on the spring bears against the inner face of the reinforcing bar 35 at the opposite side of the supporting tongue from the rod 37. In assembling the spring 62, it is loaded or placed under tension in the manner customary with such springs by winding the pressure and tension arms 64 and 65 toward one another. Thus it will be apparent that the tensioning spring 62 normally acts to urge the clamping and latching rod 37 toward and maintain it in either selected clamping or non-clamping interlocked position, but when the rod is to be shifted from one position to the other, the tension arm 64 will yield sufficiently to manipulation of the rod by swinging it laterally in a plane substantially parallel to the fender shield 18 upon a fulcrum provided by the guiding ear 45.

By preference, and for readily perceivable reasons, the interlock lug 59 is of such length that it will remain within the confines of the guide slot 55 throughout the full range of reciprocal movement of the latching and clamping rod 37.

As will be clear from Figures 4 and 9, the latching and clamping rod 37 is held in the non-clamping position thereof with the cam head 42 disposed rearwardly from the fender shield 18, the interlocked position of the interlock lug 59 within the interlock lug notch 58 maintaining such non-latching position positively. Thereby the head 42 cooperating with the hanger bar 25 and the hanger finger 28 provides a substantially tripod support structure for the fender shield when it is demounted and placed upon its back. This is of value in saving the marginal reinforcing flanges 20 and 22, the gasket 21 and the latching and clamping mechanism 34 from possible bending or other damage that might be caused by accidental bumping, scraping, dropping of the fender shield against hard or rough or uneven objects or surfaces, since the fender shield 18 is by the tripod support held well above the surface upon which it may be placed pending assembly with the fender 16.

By preference, means are provided for positively locking the clamping and latching rod 37 in service against unintentional displacement from the latching and clamping position as shown in Fig. 7. Herein such means include an elongated locking lever 67 (Figs. 3, 4 and 5). This lever 67 may conveniently be in the form shown comprising a sheet metal plate pivotally secured at one end in a horizontal plane by means such as a rivet 68 and a spacer 69 to the guiding and interlock plate 54 on the side thereof opposite the interlock notch 57. Through this mounting of the locking lever 67, it is adapted to be swung outwardly as shown in Fig. 4 to release the latching and clamping rod 37 for operative manipulation. When the latching and clamping rod 37 has been returned into either its latching and clamping or non-latching position so that the interlock lug 59 is either in the interlock notch 57 or the interlock notch 58, as the case may be, the locking lever 67 is adapted to be swung inwardly into locking position as shown in Fig. 5. Then a locking cutout or clearance 70 in the lever receives an anti-friction, roller type of relatively thick washer 71 freely rotatably concentric about the lower end portion of the latching and clamping rod 37 above the nut 52 and below the lower end of the interlock lug 59.

Means for conveniently manipulating the lever 67 preferably comprises a downturned reinforcing flange 72 along the outer longitudinal edge of the lever which is adapted to be engaged manually for actuating the lever. The locking position of the lever 67 is adapted to be maintained by means such as a detent node or bump 73 pressed therefrom adjacent its free end and near its inner edge so that when the lever is pushed fully closed into locking position, the detent 73 cams under the lower edge of the fender shield reinforcing flange 22 and engages therebehind. The inherent resilience of the lever 67 permits it to spring sufficiently for this purpose.

Release of the locking lever 67 is easily effected by grasping its inner margin adjacent the latching detent 73 and springing the lever down until the detent clears the fender shield flange 22, whereupon the lever can be swung outwardly until the anti-friction washer 71 of the latching and clamping rod 37 is cleared for lateral movement as shown in Fig. 4.

In the modification shown in Figures 11 to 14, inclusive, all of the features of the fender shield 18 may be substantially the same as already described and the cooperation thereof with the fender may be substantially the same as already described. However, a somewhat different manipulating and locking structure is provided for the latching and clamping mechanism generally identified at 74 and comprising a supporting bar or plate 75 and a latching and clamping member 77 which in their principal construction and function are similar to the supporting bar 35 and the latching and clamping rod 37 already described.

The latching and clamping rod 77 is provided with an interlock lug 78 interengageable with appropriate interlock notches in a guiding aperture 79 provided with a guiding and interlock plate 80, substantially the same as in the previously described form, the latching and clamping rod being normally biased into either selective interlocked position by a torsion spring 81.

In the modification, the only important difference resides in the means for manipulating the latching and clamping rod 77 for reciprocal and rotary actuation and for locking the rod in the latching and clamping position thereof. Herein, such means comprises a substantially right angularly directed integral handle extension 82 at the lower terminus of the latching and clamping rod 77. The handle extension 82 is of such length that it can be sprung of its own inherent resilience to permit a latching hump 83 adjacent its free end to be cleared below the lower reinforcing flange 22 of the fender shield for disposition behind the fender shield flange and interlocking engagement of the handle extension with a locking bracket 84 secured to the fender shield flange as by rivets 85. In Figure 10 the bracket and handle arrangement are shown as found in a right hand fender shield, while in Figure 14 the same arrangement is shown in exact counterpart as found in a left hand fender shield assembly, exactly the same reference numerals being therefore applied to identify the various parts.

The locking bracket 84 is preferably of substantially U-shaped cross-section with the web thereof secured to the flange 22 and with front and rear flanges 87 and 88, respectively, extending downwardly and spaced apart to receive the handle extension 82. The rear flange is preferably wider than the front flange to provide a convenient backstop to limit the inward swing of the handle 82. The front flange 87 cooperates with the rear flange 88 and is preferably turned inwardly adjacent the hump 83, as shown at 89, to serve as a positive locking retainer for the handle extension should the same become permanently sprung so that there would be danger of the hump 83 not engaging effectively behind the fender shield flange 22.

The adjacent end edge of the locking bracket 84 is adapted to engage the side of the latching hump 83 in the full latching and clamping position of the rod 77 to hold the same positively against the displacement laterally of the interlock lug 78 from its interlock notch. Thus, when the handle 82 is to be swung into or out of the locking position it is swung down resiliently to clear the bracket 84 and then swung in or out as required. Such movement of the handle extension 82 is implemented and facilitated by having the angularly or inturned portion 89 of the outer flange of the bracket 84 conformed as a directing cam surface along which the adjacent side of the hump 83 is adapted to slide into and out of the locking position. Furthermore, in order to assure a tight, rattle free relationship of the handle extension 82 in the locked position thereof, it is adapted to be sprung slightly inwardly substantially as shown in Fig. 11. A terminal loop 90 on the handle facilitates manipulation thereof.

In order to relieve the juncture bend of the latching and clamping rod 77 and the handle extension 82 from bending strain in the springing of the handle extension 82 during manipulation thereof, a relatively rigid fulcrum bracket 91 is provided for supporting it adjacent to the juncture bend. By preference, the fulcrum bracket 91 comprises a substantially C-shaped metal member having the upper flange thereof secured as by means of a rivet 92 forming one of a pair of rivets which also serve to secure the fender shield flange 22, the reinforcing bar 27, the plate 80 and the foot flange of the supporting bar 75 in assembly. The fulcrum bracket 91 is disposed with its mouth opening outwardly and with its lower flange, identified at 93, underlying the fender shield flange 22 in spaced relation and adapted to receive the handle extension 82 slidably and provide a bending fulcrum or brace so that the handle extension may be sprung down in the free portion thereof extending beyond the bracket. For the purpose of rigidity, the bracket 91 is preferably formed with a medial reinforcing bead 94.

From the foregoing it will be observed that in both forms of the invention disclosed, mounting and dismounting of the fender shield is adapted to be effected easily and expeditiously and with a minimum of manipulative effort or skill. After the fender shield has been preliminarily mounted along its lower edge through the medium of the end hanger bracket structures and is swung on the substantially horizontal axis provided by said end hanger brackets into service engagement with the fender, the cam head of the latching and clamping member is adapted to be easily manipulated to swing into clamping and latching relation to the marginal reinforcing flange defining the fender shield opening. The latching and clamping member is then locked against rotation out of the clamping and latching position, and the interengagement of the head with the fender flange holds the clamping and latching member against reciprocal return to non-latching position as long as the locked position of the latching and clamping member prevails.

Dismounting of the fender shield is adapted to be effected with equal facility, entailing merely the release of the latching and clamping member from its locked position and rotation thereof to carry the cam head thereof out of the clamping and latching position, whereupon the reciprocal biasing spring automatically moves the latching and clamping member downwardly until the upper hook terminal is in position to engage the fender flange as the fender shield swings outwardly of its own weight and over-balance. The fender shield remains thus until it is rocked back towards the fender whereupon the hook terminal is released from and clears the fender flange and the reciprocal biasing spring snaps the latching and clamping member down until the offsetting arm at the head engages the bearing ear. In this position the head of the latching and clamping member entirely clears the fender margin as the fender shield is swung outwardly and disengaged from the end hanger brackets. In both the latching and clamping position and the unlatched position, the interlocking lateral bias of the latching and clamping member advantageously aids in the control of the latching and clamping member and automatically assures retention of the locking and clamping member in either of said positions selectively.

Although the latching and clamping mechanism is provided with the automatic features described, the mechanism is nevertheless relatively simple and rugged in construction and comprises but few and simple parts thus rendering it quite economical and assuring trouble-free service.

Cross reference is made to my earlier filed application Serial No. 705,372, filed October 24, 1946, in which certain features of novelty disclosed herein are claimed broadly.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender shield latching and clamping mechanism of the character described, a rotatable and reciprocable latching and clamping member arranged to be carried by an associated fender shield and having a cam head thereon engageable with the flange defining a wheel access opening in a fender with which the fender shield may be related for closing the wheel access opening, such engagement with the fender flange being accomplished by reciprocable movement and rotation of the latching and clamping member to carry it into the clamping and latching position, interlock means for holding the latching and clamping member against rotation from said latching and clamping position, said interlock means comprising a lug carried by the clamping and latching member and an interlock plate arranged to be carried by the fender shield and having notches therein for selective engagement by said lug in different rotated positions of the member, and means constructed to be mounted adjacent the interlock lug and normally acting upon the member for biasing the same in a direction to urge said interlock lug into interlocking relation in a selected notch in said plate.

2. In combination in a latching and clamping mechanism of the character described, a rotary latching and clamping rod having a vertically operable body and a lower terminal right angularly related manipulating handle extension, means arranged to be mounted in stationary relation to the handle extension adjacent to its terminus and interengageable therewith by springing said handle extension for holding the latter against rotation of the latching and clamping member, and a fulcrum bracket arranged to be mounted adjacent to juncture of the handle extension with the body of the rod and engageable by said handle extension for limiting flexure of the handle extension to that portion thereof between said bracket and said holding means.

3. In combination in latching and clamping mechanism for a fender shield, a rotary clamping member adapted to be carried by the fender shield and to be moved through a predetermined arc into and out of latching and clamping position relative to a fender with which the fender shield may be assembled, an interlock structure including components on the fender shield and on the clamping member for holding the member against turning, means arranged to be carried by the fender shield and engageable with said member for locking the clamping and latching member against movement out of the interlocked position, and means carried by the latching and clamping member engageable with said locking means, said locking means including a cam structure cooperable with the means carried by the latching and clamping member for assisting in movement of the locking means into the locking condition thereof.

4. In combination, a strut adapted to be secured in vertical relation at the back of a fender shield panel, a torsional latching and clamping rod having a latching and clamping head on its upper end and means at its lower end for turning the rod, means on said strut guiding the rod for rotary movement, a plate adapted to be carried by the fender shield panel and having an opening therethrough through which the rod extends, said opening being formed with an interlock notch therein, and a lug attached to and extending laterally from the torsion rod and engageable in said notch to hold the rod against turning out of a given rotary position thereof.

5. In combination a torsion latch rod, means for supporting the latch rod for rotary movement on a generally vertical axis, a clamping head on the upper end of the rod, means at the lower end of the rod for turning the rod, a lug mounted on the rod projecting laterally therefrom, a member having a notch therein receptive of said lug, and means acting on the rod for releasably holding the same in position with respect to said member to maintain the lug in interlocking relation within said notch.

6. In combination in a fender shield latching and clamping mechanism for engaging a fender at an intermediate point to retain an associated fender shield in place, a reciprocable and bodily laterally movable latching and clamping member including means adapted to be moved into latching and clamping position upon movement of the member in one direction of reciprocation, an interlock element carried by said member, and a structure arranged to be carried by the fender shield and having an interlock recess therein, said element being engageable in said recess by bodily movement of the latching and clamping member in a lateral direction and thereby holding said member against displacement from the latching and clamping position.

7. In combination in a fender shield latching and clamping mechanism for engaging a fender at an intermediate point to retain an associated fender shield in place, a reciprocable and bodily laterally movable latching and clamping member including means adapted to be moved into latching and clamping position upon movement of the member in one direction of reciprocation, an interlock element carried by said member, a structure arranged to be carried by the fender shield and having an interlock recess therein, said element being engageable in said recess by bodily movement of the latching and clamping member in a lateral direction and thereby holding said member against displacement from the latching and clamping position, and a locking lever adapted to be mounted swingably on the fender shield and to be swung into locking relation to the latching and clamping member after said interlock element has been engaged in said recess.

8. In latching and clamping mechanism of the character described, a latching and clamping rod adapted to be disposed at substantially the center of a fender shield and operable reciprocably and rotatably on a substantially vertical axis, said rod being adapted to be moved into latching and clamping position by an upward reciprocable movement and rotation in one direction and being adapted to be moved into nonlatching position by an opposite rotary and reciprocal actuation, said rod also being bodily movable laterally, interlock structure including a lug mounted on said rod and a member to be carried by the fender shield cooperable with the lug and including respective recesses receptive of the lug in either of said positions of the rod, and means normally biasing said rod laterally to drive said lug into interlocking relation in the respective one of said recesses in which the lug engages in either of said positions.

9. In combination a supporting structure including a bearing, a rotary latching and clamping rod supported rotatably in said bearing adjacent to one end of the rod, the opposite end portion of the rod having secured thereto an interlock member, a retainer having a plurality of recesses disposed radially about the said opposite end portion of the rod and interlockingly receptive of said interlock member, and means for biasing the interlock member normally into interlocking relation within any selected one of said retainer recesses for holding the latching and clamping rod against rotation.

10. In combination in a latching and clamping mechanism for a fender shield, a rotary latching and clamping member, an interlock element carried by said member, a structure arranged to be operatively disposed adjacent to the interlock carrying portion of said member and operatively engageable by said interlock element, a biasing spring arranged to be mounted adjacent the interlock-carrying portion of said member and normally operating on said member to hold the member against displacement of the interlock element from said structure, and a releasable lock disposed operatively relative to said member for locking the member against unintentional displacement thereof in opposition to said biasing spring and disengagement of the interlock element from said structure.

11. In combination in a latching and clamping mechanism for a fender shield, a rotatable latching and clamping member including a body having a laterally extending handle extension for convenient manipulation thereof, said handle extension being inherently resilient for springing thereof, an element arranged to be carried by the fender shield for holding the handle extension in a predetermined position and adapted to be interengaged by the handle by a springing manipulation thereof, a bracket also arranged to be carried by the fender shield and cooperating with said handle extension adjacent juncture of the handle extension with the body of the member to limit the springing of the handle extension to a given section extending from said bracket to said element.

GEORGE W. SCHATZMAN.

REFERENCES CITED

The following references are of record in the file of this patent:

UNITED STATES PATENTS

| Number | Name | Date |
|---|---|---|
| 167,624 | Shore | Sept. 14, 1875 |
| 1,064,313 | Garlock | June 10, 1913 |
| 1,548,907 | Schweim | Aug. 11, 1925 |
| 2,178,313 | Rossiter, Jr., et al. | Oct. 21, 1939 |
| 2,246,344 | Calderwood | June 17, 1941 |
| 2,312,536 | Fergueson | Mar. 2, 1943 |
| 2,334,867 | Fergueson | Nov. 23, 1943 |
| 2,349,466 | Schueren | May 23, 1944 |